United States Patent [19]

Gloor et al.

[11] 4,205,728
[45] Jun. 3, 1980

[54] SUCTION ATTACHMENT FOR A DRILLING TOOL

[75] Inventors: Peter Gloor, Zollikerberg, Switzerland; Fritz Mark, Mäder, Austria

[73] Assignee: Hilti Aktiengesellschaft, Schaan, Liechtenstein

[21] Appl. No.: 946,641

[22] Filed: Sep. 28, 1978

[30] Foreign Application Priority Data

Oct. 3, 1977 [DE] Fed. Rep. of Germany ....... 2744463

[51] Int. Cl.$^2$ .............................................. E21C 7/02
[52] U.S. Cl. .................................... 175/209; 175/211
[58] Field of Search ............... 173/32, 33; 175/210, 175/211; 408/76; 125/20

[56] References Cited

U.S. PATENT DOCUMENTS

| 1,057,568 | 4/1913 | Mayer et al. | 175/211 |
| 1,223,027 | 4/1917 | Brackett | 175/211 |
| 2,990,024 | 6/1961 | Van Allsburg | 175/211 |
| 3,033,298 | 5/1962 | Johnson | 125/20 |
| 3,351,143 | 11/1967 | Seibold et al. | 173/32 X |
| 3,915,241 | 10/1975 | Bieri | 408/76 X |
| 4,064,952 | 12/1977 | Lechner | 175/209 |

Primary Examiner—James A. Leppink
Attorney, Agent, or Firm—Toren, McGeady and Stanger

[57] ABSTRACT

A suction attachment for use with a drilling tool includes a muzzle part forming an opening through which a drill bit extends into contact with the material to be drilled. The muzzle part has a suction aperture communicating with the drill bit opening and a suction tube connected to the suction aperture. The suction tube includes a venturi tube section having a transverse plane of smallest cross-section spaced from the suction aperture. Extending from the transverse plane is a connecting passage which terminates at its other end in a suction recess formed in the surface of the muzzle part which faces the material to be drilled. The partial vacuum generated at the venturi tube section is transmitted through the connecting passage to the suction recess for holding the attachment on the material to be drilled.

10 Claims, 3 Drawing Figures

SUCTION ATTACHMENT FOR A DRILLING TOOL

SUMMARY OF THE INVENTION

The present invention is directed to a suction device especially adapted for use with a drilling tool. The attachment includes a muzzle part having a suction aperture from which a suction tube extends to a dust exhauster.

In drilling tools, particularly hammer drills, during the drilling operation there is a problem of considerable contamination of the surrounding area caused by the generation of dust or borings.

Because of this problem it is has been known in hammer drills having drill bits with a large cross-section to provide a central bore through which the drilled material can be drawn off into a dust exhauster forming a part of the drilling tool. The disadvantage of such an arrangement resides in that, for reasons of strength, it is possible to provide such central bores only in drill bits of relatively large diameter. Due to the cross-sectional size of the central bores, it is only possible to suction off very fine, that is, powder-like, drilled material. The entrance to the central bore is not open at the commencement of the drilling operation, accordingly, based on experience, the drilled material is only removed after the drill bit has formed a first section of the borehole. Moreover, the central bore clogs easily especially when the drilling operation is carried out in material which is not completely dry, causing interruptions in the suctioning operation. Furthermore, the manufacturing costs of the drill bits are significantly increased when a central bore is provided.

Another known suction device for a hammer drill includes a telescopically slidable suction attachment arranged laterally of the drill housing with a neck located at the front end of the attachment directed toward the drill bit axis with a head-like suction nozzle mounted on the neck so that the drill bit passes through it. This suction attachment is part of a high-power dust exhauster connected to the attachment through a hose connection so that by creating a partial vacuum, the drilled material is carried with the air flow through the suction attachment into a collecting chamber. In this known arrangement, the suction attachment must be adapted to the structural conditions of the hammer drill, that is, each type of hammer drill requires a special adjustment of the suction attachment.

Plus the other disadvantages of this suction attachment, it should be noted that in addition to the weight of the hammer drill which is considerable, the suction attachment including its connecting hose leading to the dust exhauster must be held against the surface being drilled when the drilling operation is being carried out overhead, such as into a ceiling. Moreover, the suction attachment has a spring which biases the neck and the suction nozzle toward the front end of the drill and the operator must overcome the force of this spring which increases with the drilling depth. Furthermore, access to the hammer drill is impaired by the suction attachment which extends over practically the entire length of the hammer drill during the drilling operation. Another problem is that the telescopic design of the suction attachment makes it impossible to use the entire length of the drill bit and jamming may occur relatively easily, especially since the drilling tools are used on construction sites. Finally, the design of the overall device is relatively elaborate and, as a result, the device is quite expensive.

Therefore, it is primary object of the present invention to provide an effective and insensitive suction attachment suited for use with any type and size of drilling tool. Another object of the invention is to provide a suction attachment which does not have a negative effect on the handling of the drilling tool.

In accordance with the present invention the attachment includes a suction tube having a venturi tube section with the smallest diameter portion of the section communicating through a connecting passage with a suction recess formed in a surface of a part of the attachment which faces toward the material to be drilled. The use of a venturi tube in a suction tube has long been known in flow technology. The venturi tube consists basically of a tube first converging in the direction of flow and then diverging in the form of a diffuser. The air flow generated by the dust exhauster connected to the suction tube reaches its highest velocity as it passes through the smallest transverse cross-sectional portion of the venturi tube. Because of the venturi action, the pressure is very low in the region of the smallest cross-section and a partial vacuum is developed relative to the ambient atmosphere. Subsequently, the air flow is accelerated as it continues to flow through the diffuser and the initial low velocity is regained.

In the region of the smallest cross-sectional area, the partial vacuum developed is communicated with a suction recess arranged on the surface of the muzzle part of the attachment, that is the surface which is directed toward the material to be drilled. When the suction attachment is positioned adjacent the surface to be drilled and the dust exhauster is switched on, the suction recess and the surface to be drilled form an enclosed spaced in which the partial vacuum acts. The partial vacuum secures the suction attachment to the material to be drilled without any additional means. When the drilling tool is operated, the material generated by the drilling action is removed into the dust exhauster through a suction aperture at the opening into the suction tube. The muzzle part of the attachment is constructed so that the suction aperture is positioned as close as possible to the point at which the drill bit first contacts the material to be drilled.

The connecting passage is advantageously communicated with the smallest cross-sectional area in the suction tube through one or a number of openings while the opposite end of the passage opens into the suction recess. While the openings into the venturi tube section can be formed as bores of any configuration, care must be exercised that the flow resistance does not become too high as a result of a plurality of small bores.

Preferably, the junction between the smallest cross-sectional area in the suction tube and the connecting passage is provided by an annular slit encircling the suction tube. Due to the relatively large cross-sectional areas for flow created by this arrangement, the above-mentioned resistance to flow is kept very low and, accordingly, the development of the partial vacuum within the suction recess is not hindered. Furthermore, an annular slit can be easily provided in the suction tube.

To provide a strong force for holding the suction attachment on the material to be drilled, the area of the suction recess should be substantial.

The force for holding the suction attachment is primarily determined by the degree of sealing between the suction recess and the material to be drilled. Therefore, it is advantageous, particularly when the surface of the material to be drilled is rough, to enclose the suction recess with an outwardly projecting elastic lip. Such a lip adapts to the uneven surface in an effective manner and ensures that any leaks into the suction recess are kept to a minimum.

It is advantageous to provide a screen or similar structure in the region of the opening from the connecting passage into the suction recess to prevent particles of any kind from entering the passage and thereby preventing any blockage of the passage.

To remove the suction attachment from the surface of the material being drilled when the drilling operation has been completed, and without having to use force, the partial vacuum in the suction recess must be eliminated. This can be accomplished by switching off the dust exhauster. It is advantageous, however, not to switch off the dust exhauster and, if instead blocking means are provided in the connecting passage. Accordingly, the holding action in the suction recess can be discontinued by blocking the connection passage and can be reestablished at the next point of use after the connecting passage is again opened.

Preferably, a slide member is used as the blocking means with a passageway through it which can form a part of the connecting passage. Based on the arrangement of the passageway through the slide member, it is possible to adjust the blocked position and released or open position by moving or possibly turning the slide member.

The partial vacuum in the suction recess can be eliminated, or can be eliminated faster, if, in accordance with another feature of the invention, the suction recess is connected to the ambient atmosphere to equalize the pressure. Preferably, such equalization is effected by providing another passageway through the slide member which can connect the suction recess with the atmosphere. This additional passageway is advantageously arranged so that pressure equalization is effected in the same operation in which the connecting passage is blocked.

The muzzle part of the suction attachment includes an opening through which the drill bit extends with the suction aperture communicating directly with the drill bit opening. As a result, the suction aperture can be located very closely to the point at which the drill bit enters the material to be drilled making the suction attachment especially effective. Any drilled material entering the drill bit opening is drawn off into the suction tube. Preferably, the drill bit opening has a large inside diameter so that a wide range of drill bit diameters can be employed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
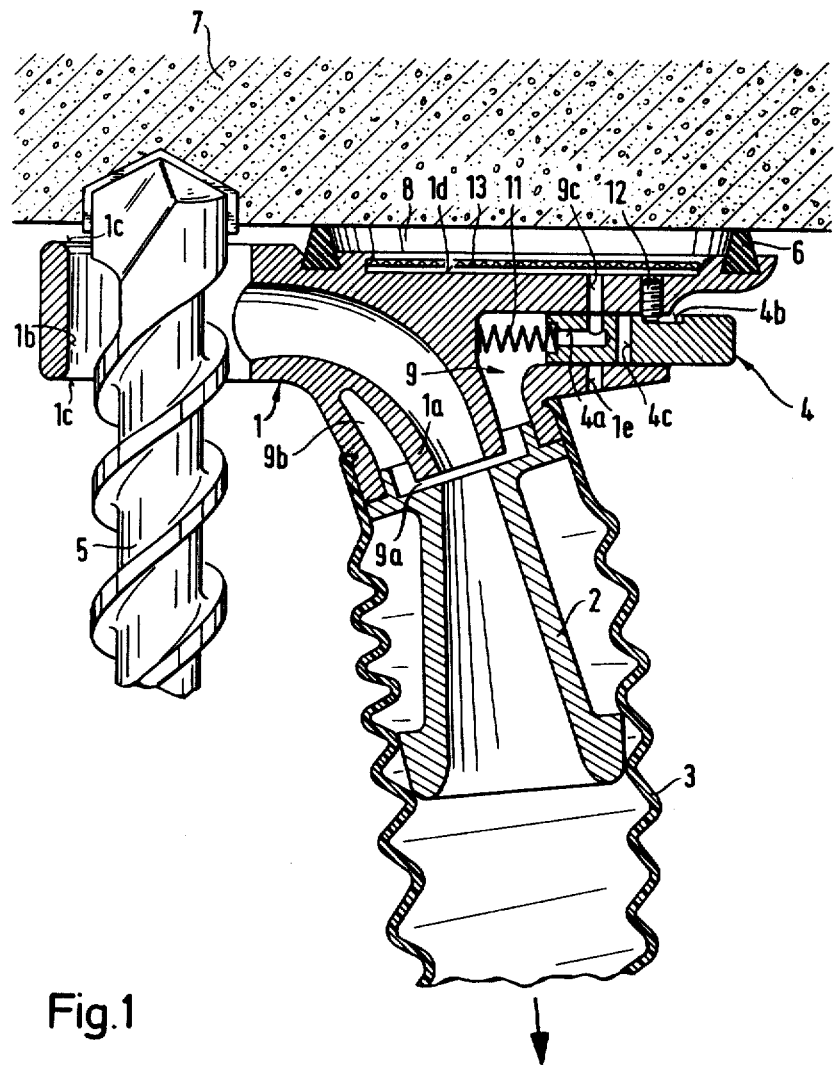
FIG. 1 is a sectional view of a suction attachment, embodying the present invention, in operating position against the surface of a material to be drilled.

In FIG. 1 the suction attachment includes a muzzle part 1 with a different part 2 connected to it. The diffusor part 2 forms a bore providing part of a venturi tube and a part of the suction tube in the attachment. A flexible suction hose 3 laterally encloses the diffusor member 2 and is secured to the muzzle part 1. At its opposite end from the muzzle part, the suction hose 3 is connected to a dust exhauster, not shown. In addition, a slide member 4 is movably displaceably mounted within the muzzle part 1.

The muzzle part 1 includes a nozzle 1a which has its inner surface in converging relation toward the diffusor member 2. In combination with the diffusor member 2, the nozzle 1a forms the inlet end of the suction tube. In combination with the diffusor member 2, the nozzle 1a forms the venturi tube and its larger diameter end forms a suction aperture communicating with the opening 1b through which drill bit 5 extends from a drilling tool, not shown, into contact with the surface of the material 7 to be drilled. The drilling tool can be operated independently of the suction attachment. Accordingly, the opening 1b cooperates with the nozzle 1a in forming the suction aperture for the attachment.

The muzzle part 1 has a surface facing toward the material 7 to be drilled. A circular lip 6 formed of a resilient material, such as rubber, is seated in the surface facing the material 7. The lip projects outwardly from the surface into contact with the material 7 which is illustrated as concrete. A recess 1d is located in the surface inwardly of the lip 6 and forms in combination with the lip a suction recess 8 when the lip is pressed against the surface of the material 7, as shown in FIG. 1. A connecting passage 9 extends through the muzzle part 1 from the suction recess 8 to the transverse plane of the smallest cross-sectional area of the venturi tube, that is, at the location of the adjacent ends of the nozzle 1a and the diffusor member 2. At the suction tube, the connecting passage 9 consists of an annular slit 9a formed by the adjacent but spaced ends of the nozzle and the diffusor member. The connecting passage is continued from the annular slit 9a by an annular space 9b extending around the nozzle 1a and this space opens to the annular slit 9a. The passage is continued by a bore 9c extending through the muzzle part 1 from the annular space 9b and through an opening 4a in the slide member into the suction recess 8. The slide member 4 is held in the position shown in FIG. 1 by a compression spring 11 biasing the slide so that its opening 4a forms a continuation of the connecting passage 9 from the annular space 9b to the bore 9c. A stud 12 fitted into the muzzle part limits the extent of the movement of the slide member. The stud 12 extends into a groove 4b in the slide member with the groove defining the extent to which the slide can be displaced. A screen 13 is positioned in the recess 1d for preventing harmful particles from entering into the connecting passage 9.

The suction attachment operates in the following manner:

With the suction hose 3 connected to a dust exhauster, not shown, and extended by the diffusor member 2 and the nozzle 1a, the combination forms a suction tube which opens through the suction aperture 1c into the drill bit opening 1b. Drilled material produced as the drill bit 5 drills into the material 7, is drawn off in the region of the suction aperture 1c, that is, within the drill bit opening 1b, first to the nozzle 1a and then through the diffusor member 2 and the suction hose 3 into a collecting chamber, not shown, of the dust exhauster due to the air flow created at the suction aperture 1c. As the air is drawn through the nozzle 1a toward the transverse plane of the smallest cross-section, it is accelerated to a very high velocity with the air flow reaching its maximum velocity at the transition in the venturi tube section, that is, at the smallest cross-sectional area of the suction tube. As a result of the increase in velocity, the pressure drops significantly with the pressure at the venturi tube transition being considerably lower than the ambient pressure. The air flow which has reached its highest velocity at the region of the smallest cross-sectional area then commences to decelerate in the diffusor tube 2 and flows through the suction tube 3 into the dust exhauster with very little pressure loss.

The partial vacuum developed at the smallest cross-sectional area in the venturi tube section is communicated through the annular slit 9a and through the connecting passage 9 to the suction recess 8. As a result, the partial vacuum is developed in the space bounded by the suction recess 8 and the surface of the material 7 to be drilled so that the muzzle part 1 and the remainder of the suction attachment are held against the material 7 by the ambient pressure.

Figure 2:
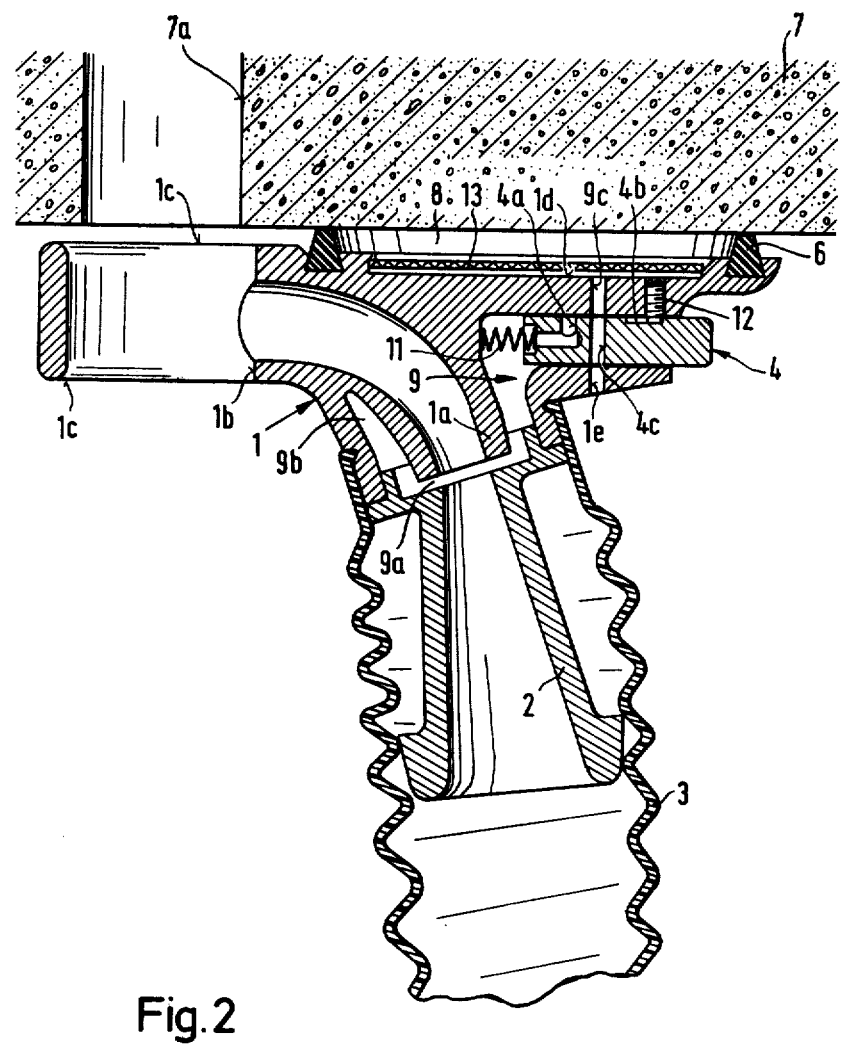
FIG. 2 is a cross-sectional view similar to that in FIG. 1, however, with the suction attachment arranged to be removed from the material to be drilled.

As shown in FIG. 2, after the drilling operation has been completed, the drill bit 5 is removed from the borehole 7a which has been drilled and the suction attachment can then be removed to another place of use. The simplest manner of removing the suction attachment from the material 7 is to cancel the partial vacuum or introduce atmospheric pressure into the suction recess 8. This is effected by pressing the slide member 4 against the force of the compression spring 11 until its movement is stopped by the stud 12 extending into the groove 4b. When the slide member 4 is displaced against the biasing action of the spring 11, the opening 4a no longer affords a continuation of the connecting passage 9 and the partial vacuum within the suction tube is blocked from communication with the suction recess 8. In addition, as the slide member moves to the left as shown in FIG. 2, a bore 4c in the slide member extending perpendicularly of its direction of movement communicates between inlet opening 1e and the bore 9c for communication with the suction recess 8. As a result, atmospheric pressure is introduced into the suction recess 8 permitting the suction apparatus to be removed from the material 7. Before the suction attachment can be secured at another point of use, it is only necessary to release the slide member 4 so that it is biased back into position by the spring 11, that is, the position as shown in FIG. 1. The suction attachment, with the slide member in the position as shown in FIG. 1, can be held against the material 7 to be drilled and, as explained above, it is automatically attached by the partial vacuum developed due to the suction flow through the venturi tube section of the suction tube.

Figure 3:
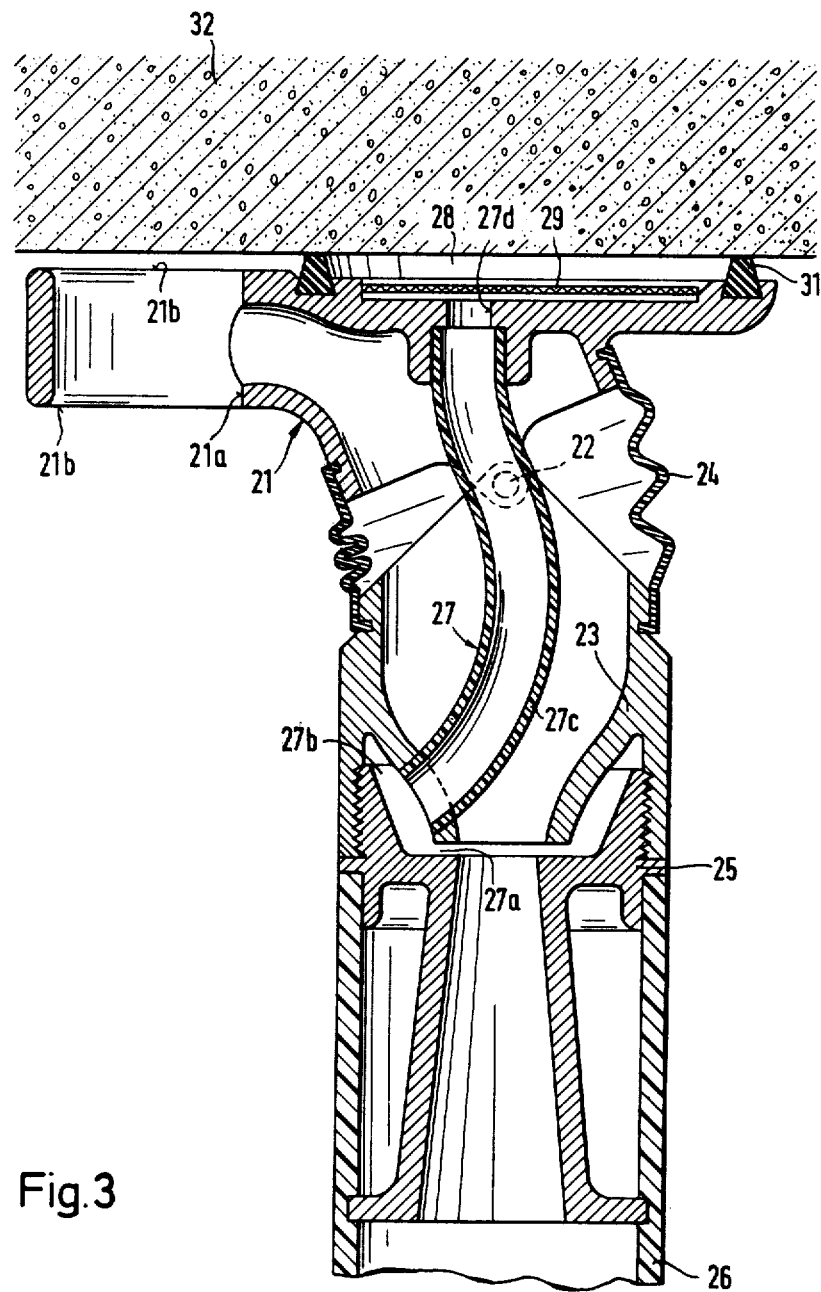
FIG. 3 is a cross-sectional view similar to FIGS. 1 and 2 of another embodiment of the suction attachment of the present invention.

In FIG. 3 another embodiment of the suction attachment is disclosed and it includes a muzzle part 21. Muzzle part 21 is pivotally connected to a nozzle 23 by hinge pins 22. As can be seen a portion of the adjacent ends of the muzzle part 21 and the nozzle 23 are spaced apart and the distance between them is bridged by a flexible bellows 24, the bellows is connected to both the muzzle part and the nozzle. A diffusor member 25 is secured to the opposite end of the nozzle 23 from the muzzle part 21. The diffusor member also serves to support a suction tube 26 connected to a dust exhauster, not shown. An opening 21a for a drill bit is provided through the muzzle part 21 and this opening combines with the end of the suction tube through the muzzle part 21 in forming suction aperture 21b. When the material 32 is being drilled any borings entering the opening 21a are drawn off through the suction aperture 21b into the suction tube for passage, in turn, through the muzzle part 21, the nozzle 23 and the diffusor member 25 to the dust exhauster. In this embodiment the smallest diameter cross-section formed by the venturi tube section of the suction tube is located at the adjacent ends of the nozzle 23 and the diffusor member 25. The surface of the muzzle part 21 has a suction recess 28 similar to the recess 8 shown in FIGS. 1 and 2. The partial vacuum at the region of smallest cross-section in the suction tube is communicated through an annular slit 27a and through a connecting passageway 27 to the suction recess 28. In addition to the annular slit 27a, the connecting passage 27 includes an annular passage laterally surrounding the nozzle 23, a pipe section 27c extending through the bore of the nozzle 23 and the muzzle part 21 to an inlet bore 27d opening into the suction recess 28. A screen 29 extends across the suction recess 28 for blocking the flow of any particles into the connecting passage 27. Further, a protruding lip 31 circles the suction recess 28 and provides an excellent sealing effect when pressed against the surface of the material 32. The operation of the suction apparatus of FIG. 3 is basically the same as the embodiment in FIGS. 1 and 2. The removal of the suction attachment can in this case also be provided by use of a slide member, though no slide member is shown. However, the removal of the suction attachment from the material 32 can also be effected in a simple manner by switching off the dust exhauster.

While specific embodiments of the invention have been shown and described in detail to illustrate the application of the inventive principles, it will be understood that the invention may be embodied otherwise without departing from such principles.

What is claimed is:

1. Suction attachment, particularly for use with a drilling tool, comprising a muzzle part to be positioned at the location where a drill bit in a drilling tool enters a material to be drilled, said muzzle part having a suction aperture arranged to draw in drilled material, an axially elongated suction tube connected at one end to said suction aperture and arranged to be connected at the other end to a dust exhauster, wherein the improvement comprises that said suction tube has a venturi tube section extending from said suction aperture including a first axially extending part commencing at said suction aperture and with the surface thereof converging inwardly to a transverse plane of smallest cross-section of said venturi tube section spaced from said suction aperture, said muzzle part forming a portion of said suction tube and constituting at least a portion of said first part of the venturi tube section extending from said suction aperture, said muzzle part including an exterior surface thereon spaced from said suction aperture and arranged to be positioned adjacent to the surface of the material to be drilled with said surface having a suction recess therein, and a connecting passage having a first end and a second end with the first end being open to the transverse plane of smallest cross-section in said venturi tube section and the second end being open to said suction recess.

2. Suction attachment, as set forth in claim 1, wherein said connecting passage has at least one opening at the second end thereof communicating with said suction recess and at least one opening at the first end thereof communicating with the transverse plane of smallest cross-section in said venturi tube section.

3. Suction attachment, as set forth in claim 2, wherein said opening at the first end of said connecting passage comprises that said muzzle part forms an annular space encircling said suction tube and an annular slit in said suction tube encircling the axis thereof communicates between the interior of said tube and said annular space.

4. Suction attachment, as set forth in claim 1, wherein an elastic lip is positioned on and extending outwardly from said surface of said muzzle part and laterally encloses said suction recess thereon.

5. Suction attachment, as set forth in claim 1, wherein means are movably mounted in said muzzle part for displacement relative to said connecting passage for selectively opening and closing said connecting passage between said suction tube and said suction recess.

6. Suction attachment, as set forth in claim 5, wherein said means for displacement relative to said connecting passage comprises a slide movably mounted in said muzzle part and having a first passageway and a second passageway therethrough, said first and second passageways being spaced and separate from one another with said first passageway affording flow through said connecting passage to said suction recess, and said second passageway affording access of ambient pressure to said suction recess.

7. Suction attachment, as set forth in claim 1, wherein said muzzle part includes a drill bit opening through which a drill bit can be inserted, and said suction aperture being open to the interior of said drill bit opening.

8. Suction attachment, as set forth in claim 3, wherein said muzzle part comprises said first part of said venturi tube section, a second part of said venturi tube section including a tube section of said suction tube having one end thereof adjacent the end of said first part at the transverse plane of smallest cross-section and with the inner surface of said tube section being in diverging relation from the transverse plane of smallest cross-section.

9. Suction attachment, as set forth in claim 8, wherein the ends of said first part and the second part located at the transverse plane of smallest cross-section are spaced apart in the axial direction of said suction tube and form therebetween said annular slit.

10. Suction attachment, as set forth in claim 3, wherein said muzzle part comprises said first part of said venturi tube section a second part of said venturi tube section said first part comprising a first tube section of said suction tube extending from said suction aperture and a second tube section extending from the end of said first tube section spaced from said suction aperture, said first and second tube sections being pivotally connected and a flexible bellows interconnecting the outer surfaces of said first and second tube sections, the inner surface of said first and second tube sections converging inwardly to the transverse plane of smallest cross-section of said venturi tube section with said second tube section terminating at the transverse plane of smallest cross-section, and said part including a third tube section of said suction tube located at one end adjacent the end of said second tube section at the transverse plane of smallest cross-section with the inner surface of said third tube section being in diverging relation from the transverse plane cross-section.

* * * * *